United States Patent [19]

Maurer et al.

[11] Patent Number: 5,294,009
[45] Date of Patent: Mar. 15, 1994

[54] LAUNDRY CART APPARATUS

[76] Inventors: David A. Maurer, 2014 N. Rand Rd. #208, Palatine, Ill. 60074; Raymond N. Maurer, 21771 Sunflower, Novi, Mich. 48375

[21] Appl. No.: 916,487

[22] Filed: Jul. 20, 1992

[51] Int. Cl.⁵ ............................ B62B 3/02; A47B 5/04; B25H 3/04
[52] U.S. Cl. ....................... 211/126; 38/106; 38/77.5; 280/47.35
[58] Field of Search .............. 211/126, 189, 182, 194; 38/104, 112, 106, 14, 77.5, 77.8; 280/47.35; 108/111, 38, 48, 99

[56] References Cited
U.S. PATENT DOCUMENTS

| | | | |
|---|---|---|---|
| 70,958 | 11/1867 | Chittenden | 108/99 |
| 186,741 | 1/1877 | Maas et al. | 38/77.5 |
| 3,502,227 | 3/1970 | Knostant et al. | 211/126 |
| 4,321,873 | 3/1982 | Nealis | 108/91 |
| 4,403,886 | 9/1989 | Haeusler | 403/293 X |
| 4,862,611 | 9/1989 | Wright | 108/48 |
| 4,973,110 | 11/1990 | Nyquist | 403/252 X |
| 5,012,937 | 5/1991 | Owens | 211/194 X |
| 5,169,009 | 12/1992 | Bomze | 211/189 X |

Primary Examiner—Paula A. Bradley
Assistant Examiner—Jeanne M. Elpel
Attorney, Agent, or Firm—Leon Gilden

[57] ABSTRACT

A laundry cart is arranged to include segmented components arranged for ease of securement relative to one another to permit ease of erection and disassembly of the organization as a unitary framework employing mirror image components in assemblage.

5 Claims, 6 Drawing Sheets

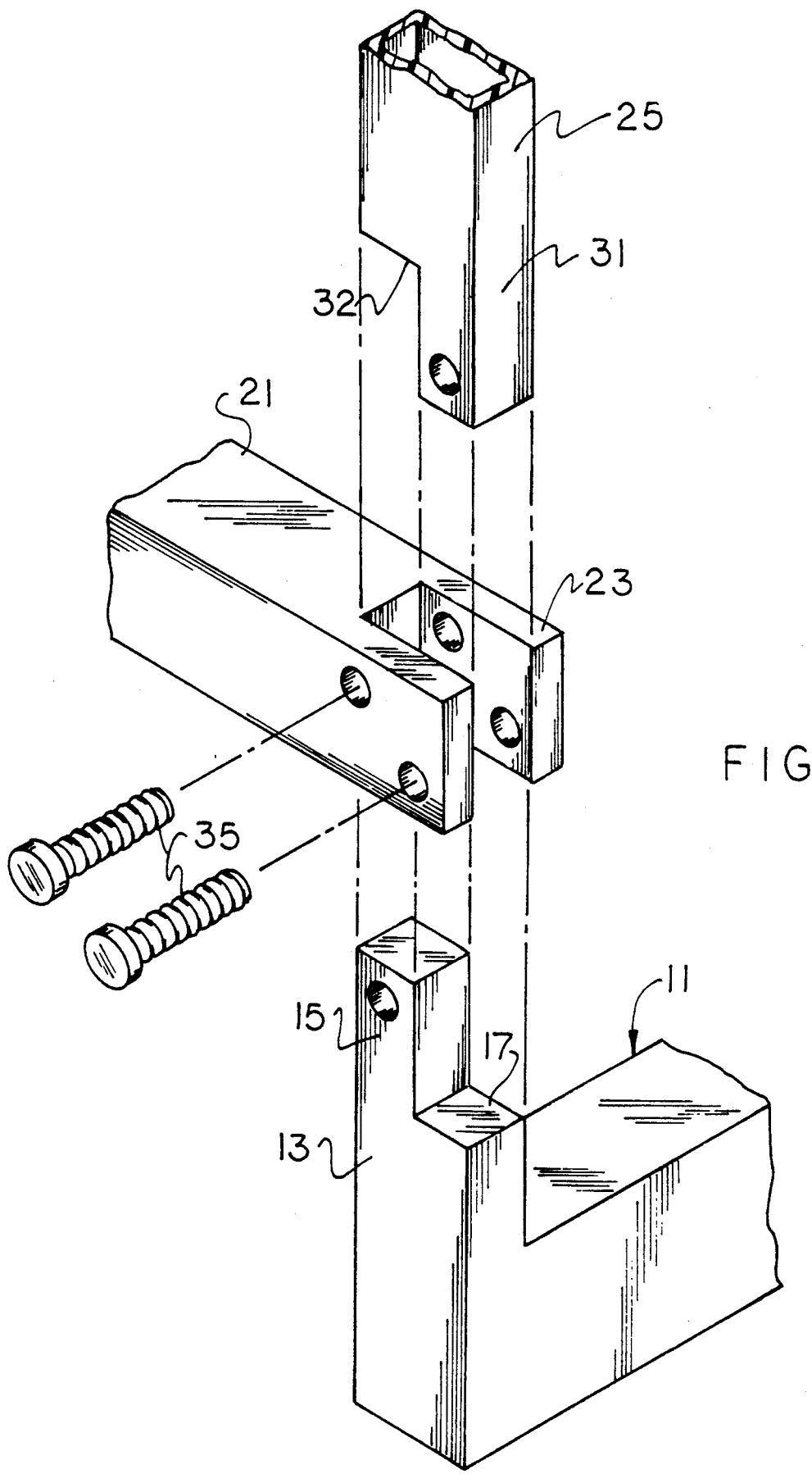

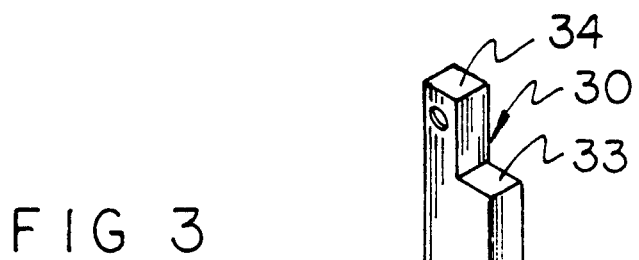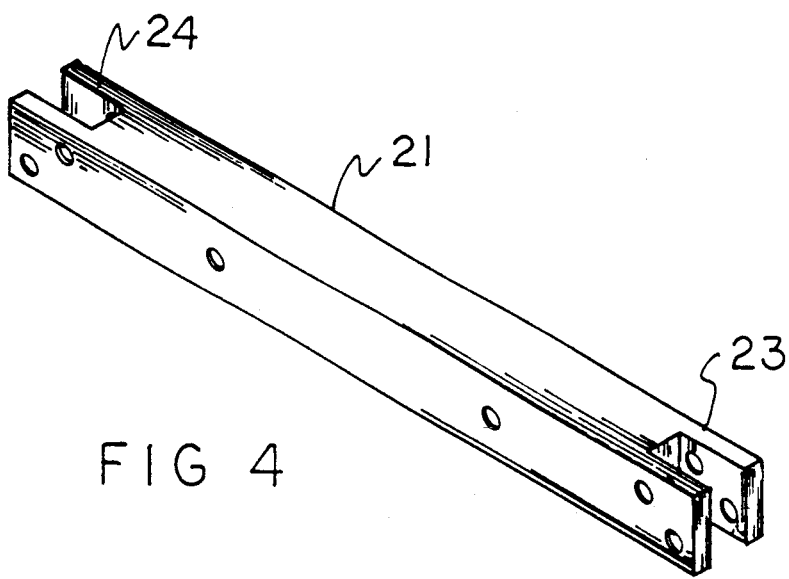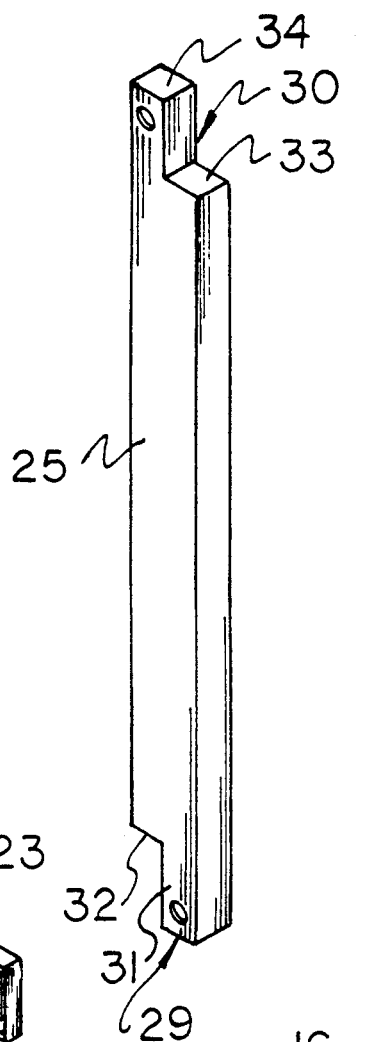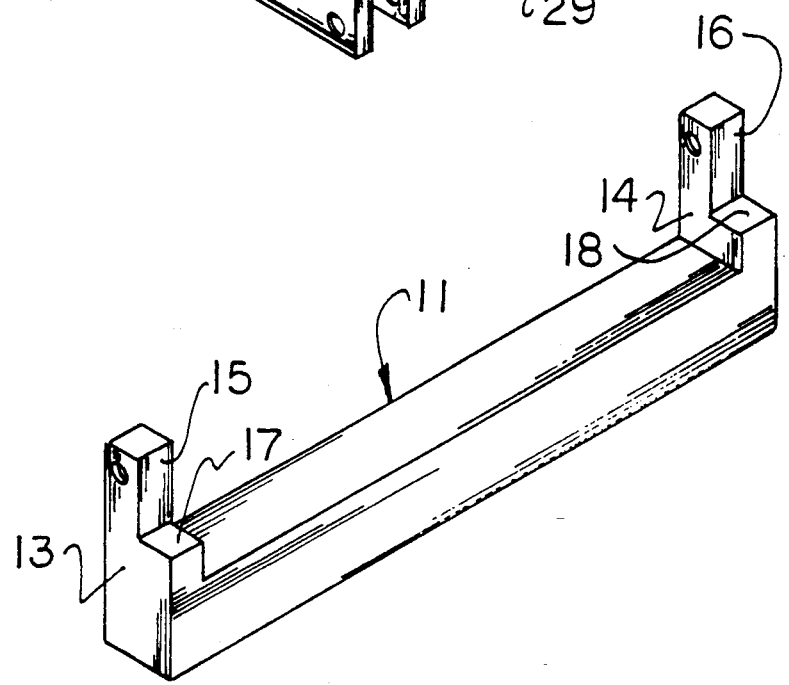

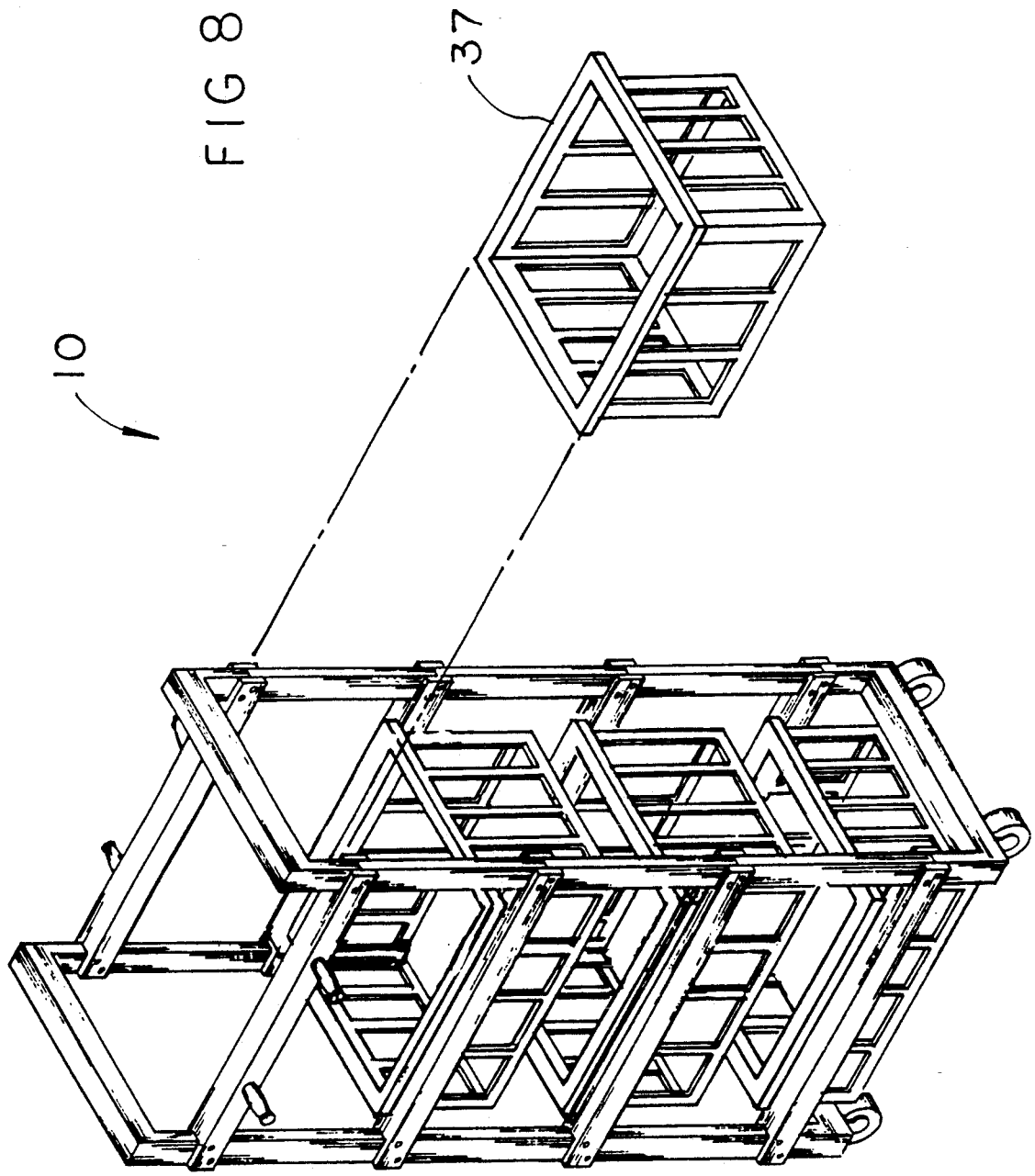

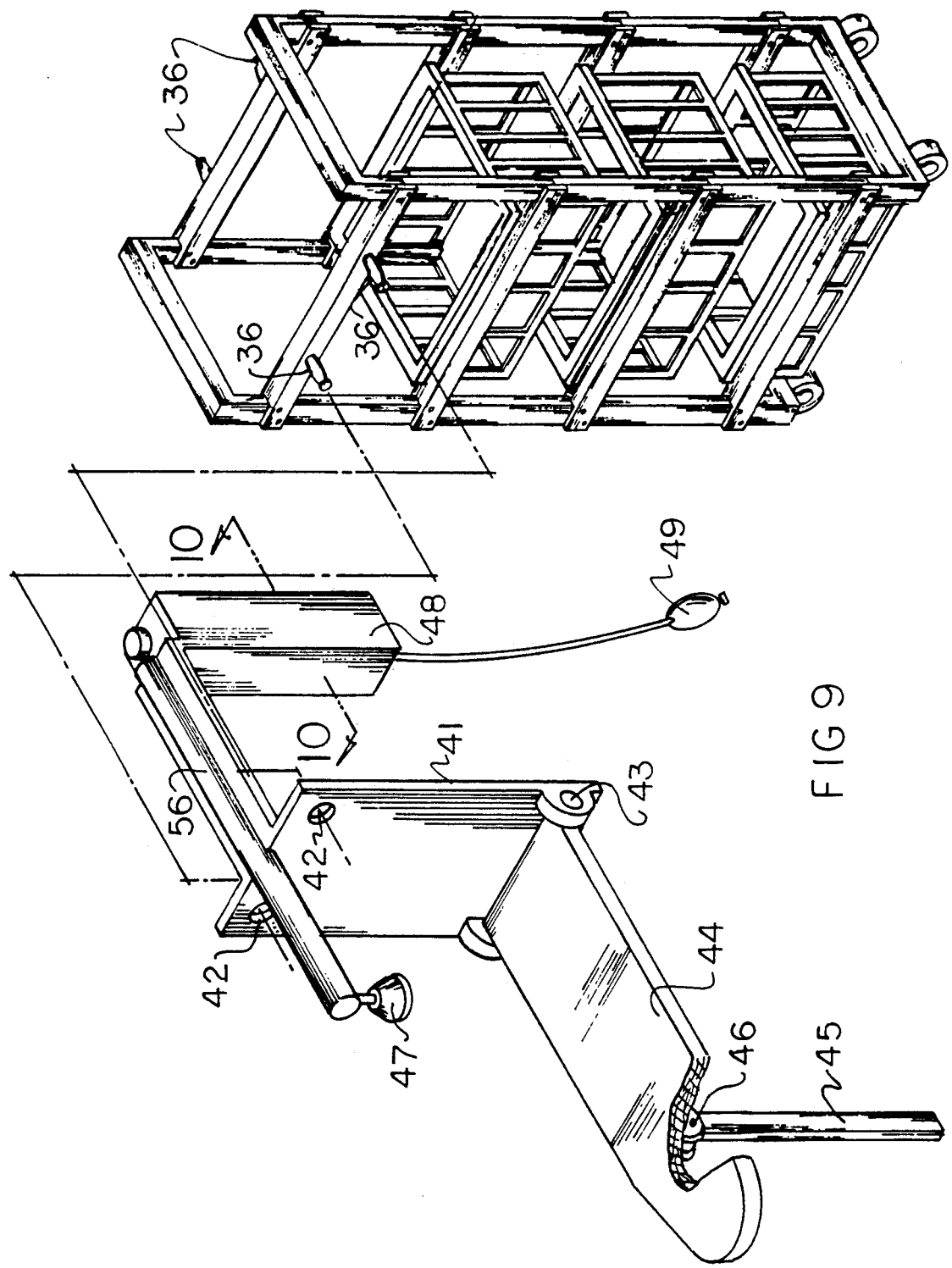

LAUNDRY CART APPARATUS

BACKGROUND OF THE INVENTION

1. Field of the Invention

The field of invention relates to cart structure, and more particularly pertains to a new and improved laundry cart apparatus wherein the same is arranged for the support and transport of various categories of laundry within various basket members.

2. Description of the Prior Art

Cart apparatus of various types have been utilized in the prior art and exemplified by the U.S. Pat. Nos. 4,248,442 to Barrett; 3,945,660 to Zawlewski; 3,743,122 to Fortiede; and 3,498,689 to Hansen. The prior art has heretofore, however, failed to set forth an organization permitting ease of assemblage of linkage components employing a majority of mirror image members arranged for ease of assemblage of the organization and in this respect, the present invention substantially fulfills this need.

SUMMARY OF THE INVENTION

In view of the foregoing disadvantages inherent in the known types of laundry cart apparatus now present in the prior art, the present invention provides a laundry cart apparatus wherein the same is arranged to slidingly mount a vertical row of laundry baskets within a unitary framework. As such, the general purpose of the present invention, which will be described subsequently in greater detail, is to provide a new and improved laundry cart apparatus which has all the advantages of the prior art laundry cart apparatus and none of the disadvantages.

To attain this, the present invention provides a laundry cart arranged to include segmented components arranged for ease of securement relative to one another to permit ease of erection and disassembly of the organization as a unitary framework employing mirror image components in assemblage.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved laundry cart apparatus which has all the advantages of the prior art laundry cart apparatus and none of the disadvantages.

It is another object of the present invention to provide a new and improved laundry cart apparatus which may be easily and efficiently manufactured and marketed.

It is a further object of the present invention to provide a new and improved laundry cart apparatus which is of a durable and reliable construction.

An even further object of the present invention is to provide a new and improved laundry cart apparatus which is susceptible of a low cost of manufacture with regard to both materials and labor, and which accordingly is then susceptible of low prices of sale to the consuming public, thereby making such laundry cart apparatus economically available to the buying public.

Still yet another object of the present invention is to provide a new and improved laundry cart apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an isometric exploded view of a junction structure of the invention.

FIG. 3 is an isometric illustration illustrating a vertical leg member utilized by the invention.

FIG. 4 is an isometric illustration illustrating the use of a cross brace member utilized by the invention.

FIG. 5 is an isometric illustration of a base member utilized by the invention and further in an inverted configuration utilized as a cap member at an uppermost end of the cart structure.

FIG. 8 is an isometric illustration of the invention utilizing slidable baskets mounted relative to the cart structure.

FIG. 9 is an isometric illustration of a portable ironing support arranged for mounting to the cart structure of the invention.

DESCRIPTION OF THE PREFERRED EMBODIMENT

Figure 1:
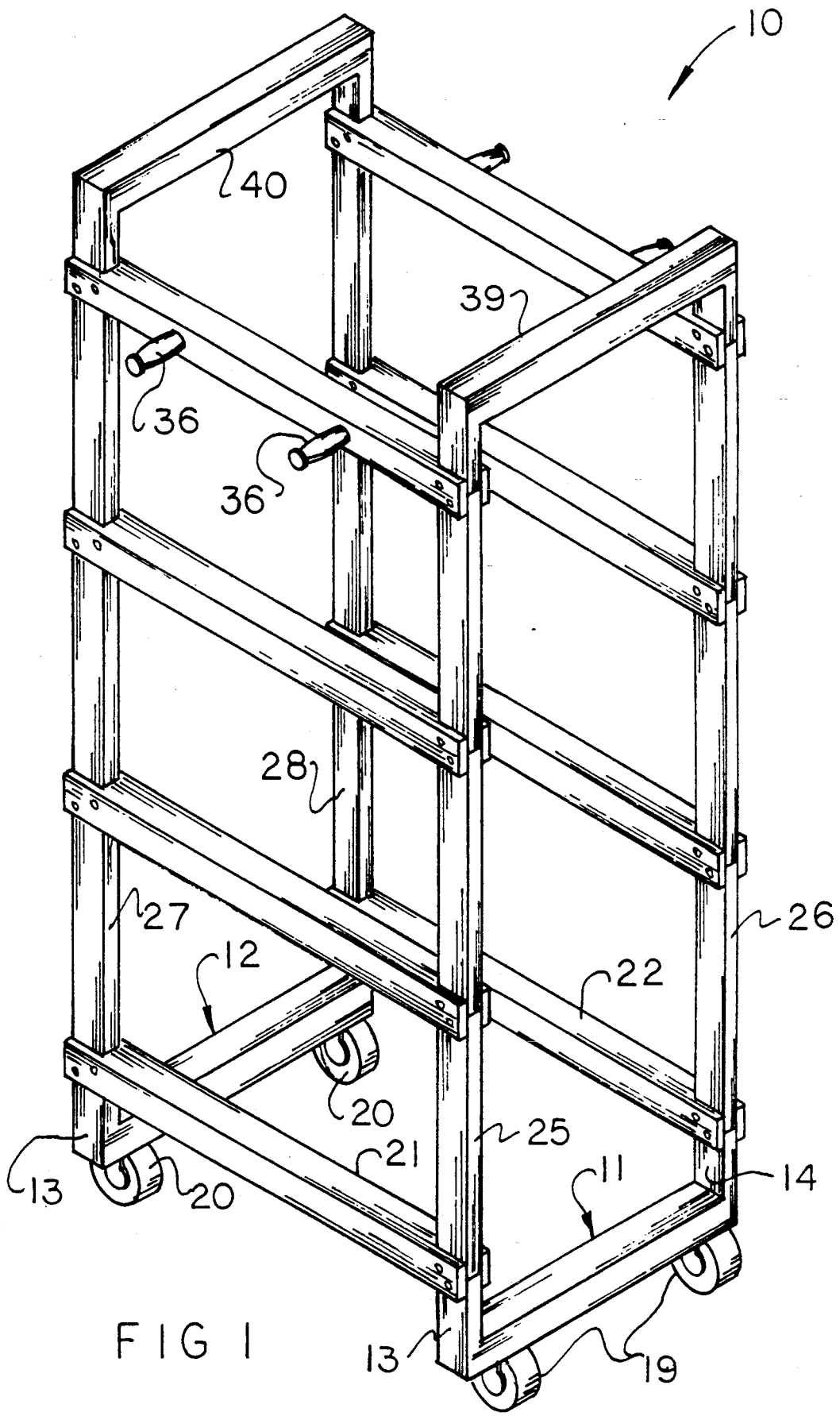
FIG. 1 is an isometric illustration of the framework structure of the invention.

With reference now to the drawings, and in particular to FIGS. 1 to 10 thereof, a new and improved laundry cart apparatus embodying the principles and concepts of the present invention and generally designated by the reference numeral 10 will be described.

Figure 6:
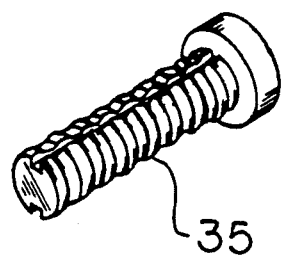
FIG. 6 is an isometric illustration of the fastener member utilized by the invention.
Figure 7:
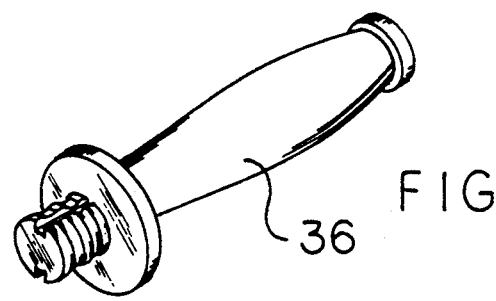
FIG. 7 is an isometric illustration of a support rod structure utilized by the invention.

More specifically, the laundry cart apparatus 10 of the instant invention essentially comprises a parallelepiped framework having respective forward and rear U-shaped bases 11 and 12 spaced apart in a parallel coextensive relationship, with each of the bases of identical configuration having respective first and second parallel legs 13 and 14, with the respective first and second legs 13 and 14 including first and second leg extensions 15 and 16 extending beyond respective first and second leg abutment surfaces 17 and 18. Respective forward and rear pairs of caster wheels 19 and 20 are mounted to the forward and rear U-shaped bases 11 and 12 respectively oriented and directed therebelow for support of the framework. First and second cross braces 21 and 22 of identical configuration arranged in a parallel coextensive relationship include respective forward and rear bifurcated ends 23 and 24 arranged for receiving the respective first and second leg extensions 15 and 16 of the forward and rear bases 11 and 12 within the respective forward and rear bifurcated ends 23 and 24. Extending into the bifurcated ends are vertical legs, as illustrated, including respective first, second, third, and fourth respective vertical legs 25, 26, 27, and 28 that are arranged parallel relative to one another defining a rectilinear parallelpiped configuration, wherein the intersection of the forward bifurcated end of the first cross brace 21 in association with the first leg 13 of the forward U-shaped base 11 and the leg lower end 29 of the first vertical leg 25 defines a first intersection that is arranged to receive a plurality of fasteners 35 having serrated cylindrical side walls, of a type as illustrated in FIG. 6 for example. The second intersection is defined by intersection of the forward bifurcated end 23 of the second cross brace 22 receiving the second leg 14 of the forward U-shaped base 11 and the lower end 29 of the second vertical leg 26. A third intersection is defined by joining of the rear bifurcated end 24 of the first cross brace 21, with the first leg 13 of the rear U-shaped base 12 in association with the lower end 29 of the third leg 27. A fourth intersection in a like manner joins the rear bifurcated end 24 of the second cross brace 22 with the second leg 14 of the rear U-shaped base 12 with the lower end 29 of the fourth vertical leg 28. It should be noted that the lower ends 29 of each of the vertical legs 25-28 includes a lower extension leg 31 that is arranged for engagement with the abutment surfaces 17 and 18 of the first and second legs 13 and 14, while a lower end abutment face 32 of each lower end 29 receives the leg extensions 15 or 16 of the first and second legs 13 and 14, in a manner as illustrated in FIG. 2. In this manner, each of the vertical legs includes a leg upper end 30 having an upper end extension leg 34 extending upwardly and beyond an upper end abutment face 33, as indicated in the FIG. 3 for example. The vertical leg upper ends 30 are arranged to permit securement of further tiers of first and second cross braces 21 and 22 in cooperation with additional vertical leg structures, as indicated in FIG. 1, to provide for a rectilinear parallelepiped framework of any desired height. Upon fastening of various tiers of the assemblages together, in a manner as indicated in FIG. 1, forward and rear U-shaped caps 39 and 40 are provided which are inverted configurations of the forward and rear U-shaped bases 11 and 12 and constructed in a like manner, such as indicated in FIG. 5. The uppermost cross braces as indicated are arranged to receive support rods 36 orthogonally therein spaced apart a predetermined spacing for support of various hangers and the like. The various components may be formed of various contemporary materials to include honeycomb type structure, foam filled structure, and the like. Typically, polymeric material is utilized to minimize weight in construction. The pairs of first and second cross braces 21 and 22 are each arranged to secure an associated basket member 37, such as illustrated in FIG. 8, in a sliding relationship, wherein each basket member includes an upper peripheral flange arranged to be slidably received upon the top surfaces of the cross braces.

Figure 10:
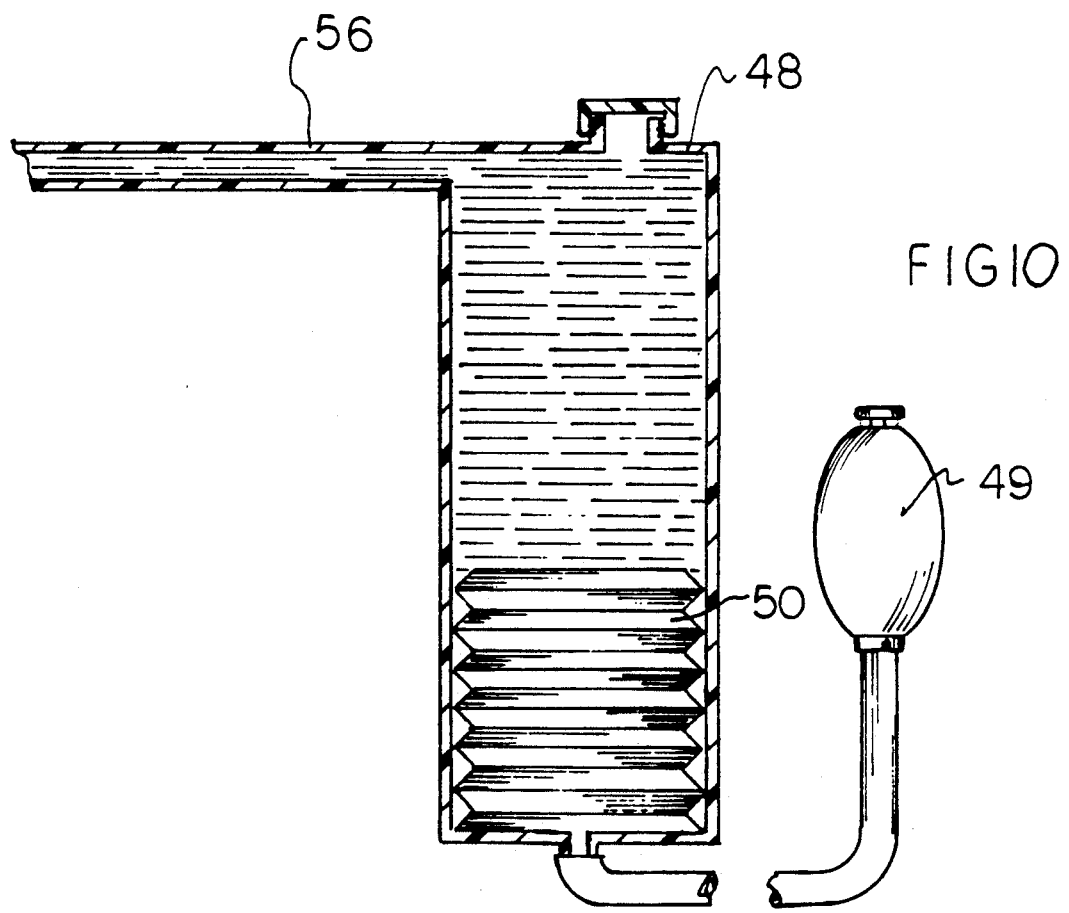
FIG. 10 is an orthographic view, taken along the lines 10—10 of FIG. 9 in the direction indicated by the arrows.

The FIGS. 9 and 10 indicate the use of an optional ironing board structure to include a mounting plate 41 having mounting plate bores 42 directed therethrough spaced apart a predetermined spacing to be received on a pair of the support rods 36. The lower edge of the mounting plate includes a plate hinge 43 pivotally mounting an ironing board member 44 to the hinge 43, with a bottom surface of the ironing board member 44 having a support leg 45 pivotally mounted about a pivot hinge 46. A conduit 56 is mounted orthogonally relative to the mounting plate 41 extending forwardly and rearwardly of the mounting plate, with a forward end of the conduit 56 having a spray nozzle 47 with a rear end in fluid communication with a fluid reservoir 48 directed below the conduit 56, with the reservoir 48 having a pneumatic bladder 50 mounted in a lower portion of the reservoir, wherein a squeeze bulb 49 effects selective pressurizing of the bladder 50 to direct fluid from the reservoir 48 through the conduit 56 and the nozzle 47 to spray a garment (not shown) positioned upon the ironing board member 44 below the nozzle 47.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A laundry cart apparatus, comprising, a rectilinear parallelepiped framework having a forward U-shaped base arranged parallel, coextensive to, and in a spaced relationship relative a rear U-shaped base, with each base having a first leg and a second leg, and a first cross brace having a first cross brace forward bifurcated end and a first cross brace rear bifurcated end, with the first cross brace forward bifurcated end receiving the forward base first leg, and the first cross brace rear bifurcated end receiving the rear base first leg, and the second cross brace forward bifurcated end receiving the forward base second leg, and the second cross brace rear bifurcated end receiving the rear base second leg, and a basket member having a basket perimeter flange slidably received on the first cross brace and the second cross brace.

2. An apparatus as set forth in claim 1 including a first vertical leg orthogonally oriented to the first cross brace, with the first vertical leg having a leg lower end received within the first cross brace forward bifurcated end, and a second vertical leg having a second vertical leg lower and received within the second brace forward bifurcated end, and a third vertical leg having a third vertical leg lower end received within the first cross brace rear bifurcated end, and a fourth vertical leg having a fourth vertical leg lower end received within the second cross brace rear bifurcated end.

3. An apparatus as set forth in claim 2 wherein each first leg of the forward and rear base includes a first leg extension and a first leg abutment surface oriented below the first leg extension, and each vertical leg lower end having a lower end extension leg received in engagement with the first leg abutment surface and a lower end abutment face in engagement with the first leg extension.

4. An apparatus as set forth in claim 3 including a mounting plate, the mounting plate including a plurality of mounting plate bores spaced apart the predetermined spacing receiving the support rods therethrough, the mounting plate having a mounting plate hinge positioned adjacent a lower edge of the mounting plate, and an ironing board plate member hingedly mounted to the mounting plate at the mounting plate hinge, the ironing board member having a support leg, the support leg including a pivot hinge, and the pivot hinge mounted to a bottom surface of the ironing board member pivotally mounting the support leg to the ironing board member.

5. An apparatus as set forth in claim 4 including a rigid conduit orthogonally mounted to an upper edge of the mounting plate, with a spray nozzle mounted to a first end of the rigid conduit oriented over the ironing board member and the rigid conduit having a rigid conduit second end, and a fluid reservoir in fluid communication with the rigid conduit second end, and an expandable pneumatic bladder positioned within the fluid reservoir, and a squeeze bulb, wherein the squeeze bulb is arranged to effect selective expansion of the bladder to project fluid from within the fluid reservoir through the rigid conduit and the spray nozzle.

* * * * *